US011948278B2

(12) United States Patent
Peng et al.

(10) Patent No.: US 11,948,278 B2
(45) Date of Patent: Apr. 2, 2024

(54) IMAGE QUALITY IMPROVEMENT METHOD AND IMAGE PROCESSING APPARATUS USING THE SAME

(71) Applicant: National Chengchi University, Taipei (TW)

(72) Inventors: Yan-Tsung Peng, Taipei (TW); Sha-Wo Huang, Taipei (TW); Ming-Hao Lin, Taipei (TW); Chin-Hsien Wu, Taipei (TW); Chun-Lin Tang, Taipei (TW)

(73) Assignee: National Chengchi University, Taipei (TW)

( * ) Notice: Subject to any disclaimer, the term of this patent is extended or adjusted under 35 U.S.C. 154(b) by 161 days.

(21) Appl. No.: 17/405,050

(22) Filed: Aug. 18, 2021

(65) Prior Publication Data

US 2022/0122225 A1 Apr. 21, 2022

(30) Foreign Application Priority Data

Oct. 21, 2020 (TW) .................................. 109136487

(51) Int. Cl.
*G06T 5/00* (2006.01)
*G06N 3/045* (2023.01)
*G06T 5/20* (2006.01)

(52) U.S. Cl.
CPC ............. *G06T 5/002* (2013.01); *G06N 3/045* (2023.01); *G06T 5/20* (2013.01)

(58) Field of Classification Search
CPC . G06T 5/002; G06T 5/20; G06T 2207/20084; G06N 3/045; G06N 3/047; G06N 3/084
See application file for complete search history.

(56) References Cited

U.S. PATENT DOCUMENTS 10,832,097 B2* 11/2020 Freeman .................. G06N 3/04
2018/0018556 A1* 1/2018 Young .................... G06N 3/063
(Continued)

FOREIGN PATENT DOCUMENTS

CN 107464227 12/2017
KR 2019-0119548 * 10/2019
(Continued)

OTHER PUBLICATIONS

Y. -T. Peng and S. -W. Huang, "Image Impulse Noise Removal Using Cascaded Filtering Based on Overlapped Adaptive Gaussian Smoothing and Convolutional Refinement Networks," in IEEE Open Journal of the Computer Society, vol. 2, pp. 382-392, 2021, doi: 10.1109/OJCS.2021.3117738. (Year: 2021).*

(Continued)

*Primary Examiner* — Andrae S Allison
(74) *Attorney, Agent, or Firm* — JCIPRNET

(57) ABSTRACT

An image quality improvement method and an image processing apparatus using the same are provided. Denoising filtering is performed to an original image by a filter to obtain a preliminary processing image. The preliminary processing image is input to a multi-stage convolutional network model to generate an optimization image through the multi-stage convolutional network model. The multi-stage convolutional network model includes multiple convolutional network sub-models, and these convolutional network sub-models respectively correspond to different network architectures.

8 Claims, 4 Drawing Sheets

(56) References Cited

U.S. PATENT DOCUMENTS

| | | | |
|---|---|---|---|
| 2019/0251433 A1* | 8/2019 | Lin | G06N 3/082 |
| 2020/0092453 A1 | 3/2020 | Gordon et al. | |
| 2020/0302265 A1* | 9/2020 | Wang | G06N 3/04 |
| 2021/0125029 A1* | 4/2021 | Young | G06N 3/02 |

FOREIGN PATENT DOCUMENTS

| | | |
|---|---|---|
| TW | 201935327 | 9/2019 |
| TW | 202017371 | 5/2020 |

OTHER PUBLICATIONS

Zeng et al (NPL titled: Multi-target deep neural networks: Theoretical analysis and implementation ) discloses Neurocomputing 273 (2018) 634-642 . (Year: 2018).*

Varghese, Justin, et al. "Adaptive Gaussian notch filter for removing periodic noise from digital images." IET Image Processing 14.8 (Mar. 2020): 1529-1538. (Year: 2020).*

Xiu, Chunbo, and Xuemiao Su. "Composite convolutional neural network for noise deduction." IEEE Access 7 (2019): 117814-117828. (Year: 2019).*

Zhang, J., Cao, L., Wang, T., Fu, W., & Shen, W. (2022). NHNet: A non-local hierarchical network for image denoising. IET Image Processing, 16(9), 2446-2456. (Year: 2022).*

Wang, W., Chen, G., Chen, H., Dinh, T. T. A., Gao, J., Ooi, B. C., . . . & Zhang, M. (2016). Deep learning at scale and at ease. (Year: 2016).*

Lee, JH., Kim, CS. (2020). Multi-loss Rebalancing Algorithm for Monocular Depth Estimation. In: Vedaldi, A., Bischof, H., Brox, T., Frahm, JM. (eds) Computer Vision—ECCV 2020. ECCV 2020. Lecture Notes in Computer Science(), vol. 12362. Springer, Cham. https://doi.org/10.1007/978-3-030-58520-4_46 (Year: 2020).*

Lingshuai Kong, et al., "Improvement of Linear Filter in Image Denoising", International Conference on Intelligent Earth Observing and Applications, Proceedings vol. 9808, Dec. 9, 2015, pp. 98083F-1-98083F-7.

Alan C. Bovik, "Handbook of image and video processing", Academic Press, Jun. 14, 2000, pp. 1-891.

D. R. K. Brownrigg, et al., "The weighted median filter", Communications of the ACM, vol. 27, No. 8, Aug. 1, 1984, pp. 807-818.

C. Tomasi, et al., "Bilateral filtering for gray and color images", Sixth International Conference on Computer Vision (IEEE Cat. No. 98CH36271), Jan. 7, 1998, pp. 839-846.

JJ. Francis, et al., "The bilateral median filter", in Proceedings of the 14th Symposium of the Pattern Recognition Association of South Africa, Citeseer, 2003 , pp. 1-6.

Kai Zhang, et al., "Beyond a gaussian denoiser: Residual learning of deep cnn for image denoising", IEEE Transactions on Image Processing, vol. 26, No. 7, Jul. 2017, pp. 3142-3155.

Yan Xing, et al., "Deep cnn for removal of salt and pepper noise", IET Image Processing, Feb. 25, 2019, pp. 1550-1560.

Eirikur Agustsson, et al., "Ntire 2017 challenge on single image super-resolution: Dataset and study", IEEE Conference on Computer Vision and Pattern Recognition Workshops (CVPRW), Jul. 21-26, 2017, pp. 1122-1131.

S. Esakkirajan, et al., "Removal of High Density Salt and Pepper Noise Through Modified Decision Based Unsymmetric Trimmed Median Filter", IEEE Signal Processing Letters, vol. 18, No. 5, Mar. 3, 2011, pp. 287-290.

Kenny Kal Vin Toh, et al., "Noise adaptive fuzzy switching median filter for salt-and-pepper noise reduction", IEEE Signal Processing Letters , vol. 17,No. 3, Dec. 18, 2009, pp. 281-284.

U. Erkan, et al., "Different applied median filter in salt and pepper noise", Computers & Electrical Engineering vol. 70, Jan. 15, 2018, pp. 789-798.

Samsad Beagum Sheik Fareed, et al., Fast adaptive and selective mean filter for the removal of high-density salt and pepper noise, IET Image Processing, Mar. 16, 2018, pp. 1378-1387.

Phillip Isola, et al., "Image-to-Image translation with conditional adversarial networks", retrieved on Nov. 26, 2018, Available at: https://arxiv.org/abs/1611.07004v3.

Ming-Hao Lin, "Image Denoising based on Overlapped Adaptive Gaussian Smoothing and Convolutional Refinement Networks", Journal of latex class files, vol. 14, No. 8, Aug. 2015. pp. 1-8.

* cited by examiner

IMAGE QUALITY IMPROVEMENT METHOD AND IMAGE PROCESSING APPARATUS USING THE SAME

CROSS-REFERENCE TO RELATED APPLICATION

This application claims the priority benefit of Taiwan application Ser. No. 109136487, filed on Oct. 21, 2020. The entirety of the above-mentioned patent application is hereby incorporated by reference herein and made a part of this specification.

BACKGROUND

Technical Field

The disclosure relates to an image processing technology, and more particularly to an image quality improvement method and an image processing apparatus using the same.

Description of Related Art

With the advancement of technology, modern people are increasingly dependent on consumer electronic products, such as portable electronic apparatuses with camera functions that have gradually gained major popularity and become an indispensable tool in modern life. Since many consumer electronic products have camera functions, people may take pictures and make video recordings almost anytime and anywhere. The consumer electronic products with camera functions all have image sensors composed of photosensitive elements. When these photosensitive elements or other related electronic elements receive severe disturbances of image signals, images will generate impulse noise, and the most common impulse noise is salt-and-pepper noise, which randomly generates many noise pixels similar to salt and pepper in the images.

However, due to increasingly widespread digital image applications, image quality is gaining more and more attention as good image quality is much needed in national defense, medical care, daily life, transaction, or other fields for obtaining correct information. In particular, good image quality is exceptionally important for computer vision technology providing related application services according to digital images. Therefore, image noise not only reduces image quality and make it hard to see the image content clearly but also has a considerably adverse effect on image analysis processing and other computer vision applications or leads to misjudgments. Based on this, how to eliminate the image noise has always been a very important issue.

At present, many image denoising methods and related algorithms have been proposed to remove noise components in an image. These image denoising methods include using various denoising filters to perform denoising filtering to the image. However, either linear filters or non-linear filters may cause a blur of the image edge or image distortion. In addition, the filter mask size of the denoising filters also directly affects denoising results of the image. Generally speaking, when the filter mask size of the denoising filters is relatively small, denoising effect for high-density noise is not ideal. On the contrary, when the filter mask size of the denoising filters is relatively large, the image is prone to be blurred. In addition, there are currently literature suggesting using a convolutional neural network model to eliminate the image noise, but it is not effective in removing the high-density noise. Alternatively, there are also literature suggesting training different convolutional neural network models for different noise densities, but this is not a practical approach, either.

SUMMARY

In view of the above, the disclosure provides an image quality improvement method and an image processing apparatus using the same, which may eliminate image noise and restore image details.

The embodiments of the disclosure provide an image quality improvement method, including the following steps. An original image is received, and denoising filtering is performed to the original image by a filter to obtain a preliminary processing image. The preliminary processing image is input to a multi-stage convolutional network model to generate an optimization image through the multi-stage convolutional network model. The multi-stage convolutional network model includes multiple convolutional network sub-models that respectively correspond to different network architectures.

The embodiments of the disclosure provide an image processing apparatus, including a storage circuit and a processor. The processor is coupled to the storage circuit and is configured to perform the following steps. An original image is received, and denoising filtering is performed to the original image by a filter to obtain a preliminary processing image. The preliminary processing image is input to a multi-stage convolutional network model to generate an optimization image through the multi-stage convolutional network model. The multi-stage convolutional network model includes multiple convolutional network sub-models that respectively correspond to different network architectures.

Based on the above, in the embodiments of the disclosure, denoising filtering is preliminarily performed to the original image by the filter, and the multi-stage convolutional network model including multiple convolutional network sub-models is used to repair the image edge and restore image details. In this way, for an original image with high-density noise, the disclosure may eliminate image noise and generate an optimization image retaining image details.

In order to make the aforementioned features and advantages of the disclosure comprehensible, embodiments accompanied with drawings are described in detail below.

DESCRIPTION OF THE EMBODIMENTS

Figure 1:
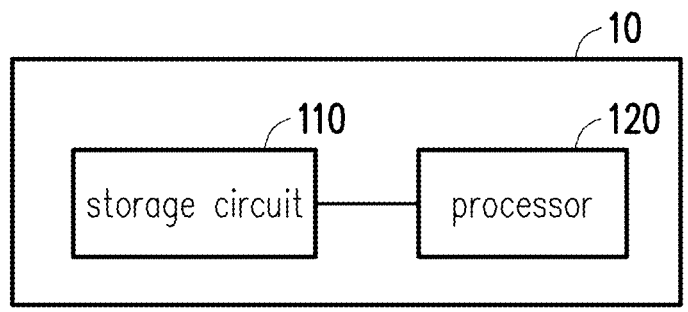
FIG. 1 is a schematic diagram of an image processing apparatus according to an embodiment of the disclosure.

Part of the embodiments of the disclosure will be described in detail below with accompanying drawings. For the reference numerals used in the following description, the same reference numerals appearing in different drawings will be regarded as the same or similar elements. These embodiments are only a part of the disclosure and do not disclose all possible implementations of the disclosure. More precisely, these embodiments only serve as examples of the method and apparatus within the scope of the claims of the disclosure.

FIG. 1 is a schematic diagram of an image processing apparatus according to an embodiment of the disclosure. An image processing apparatus 10 includes a storage circuit 110 and a processor 120.

The storage circuit 110 is used to store data and program codes such as an operating system, an application program, a driving program, or other data accessible by the processor 120, and the storage circuit 110 may be, for example, any type of fixed or mobile random access memory (RAM), read-only memory (ROM), flash memory, or a combination thereof.

The processor 120 is coupled to the storage circuit 110, and the processor 120 is a central processing unit (CPU), an application processor (AP), or other programmable general-purpose or special-purpose microprocessor, a digital signal processor (DSP), an image signal processor (ISP), a graphics processing unit (GPU), or other similar apparatuses, integrated circuits, and a combination thereof. The processor 120 may access and execute the program codes and software elements recorded in the storage circuit 110 to implement an image quality improvement method in the embodiments of the disclosure.

In this embodiment, the storage circuit 110 of the image processing apparatus 10 stores multiple program code fragments, and the program code fragments are executed by the processor 120 after installed. For example, the storage circuit 110 includes multiple modules, and each operation applied to the image processing apparatus 10 is performed by these modules. Each of the modules is composed of one or more program code fragments. However, the disclosure is not limited thereto, and each operation of the image processing apparatus 10 may also be implemented in other hardware forms.

Figure 2:
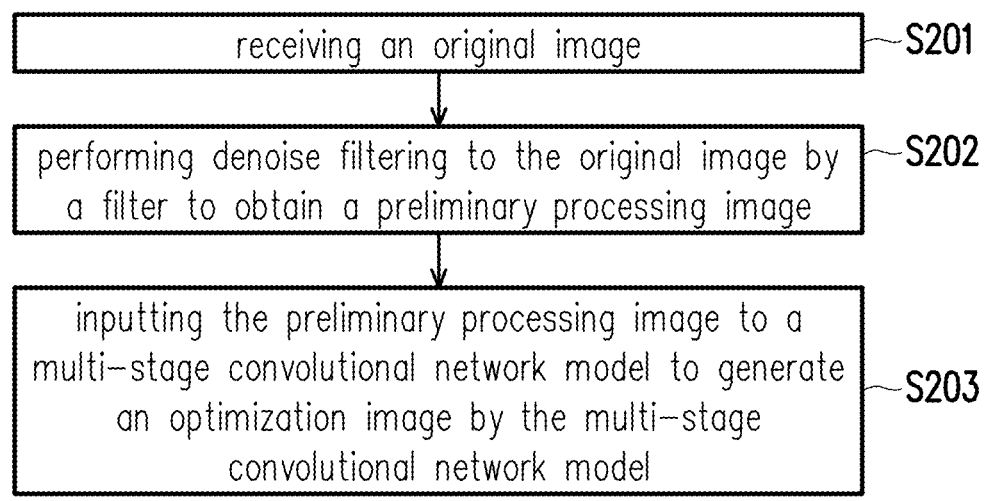
FIG. 2 is a flowchart of an image quality improvement method according to an embodiment of the disclosure.
Figure 3:
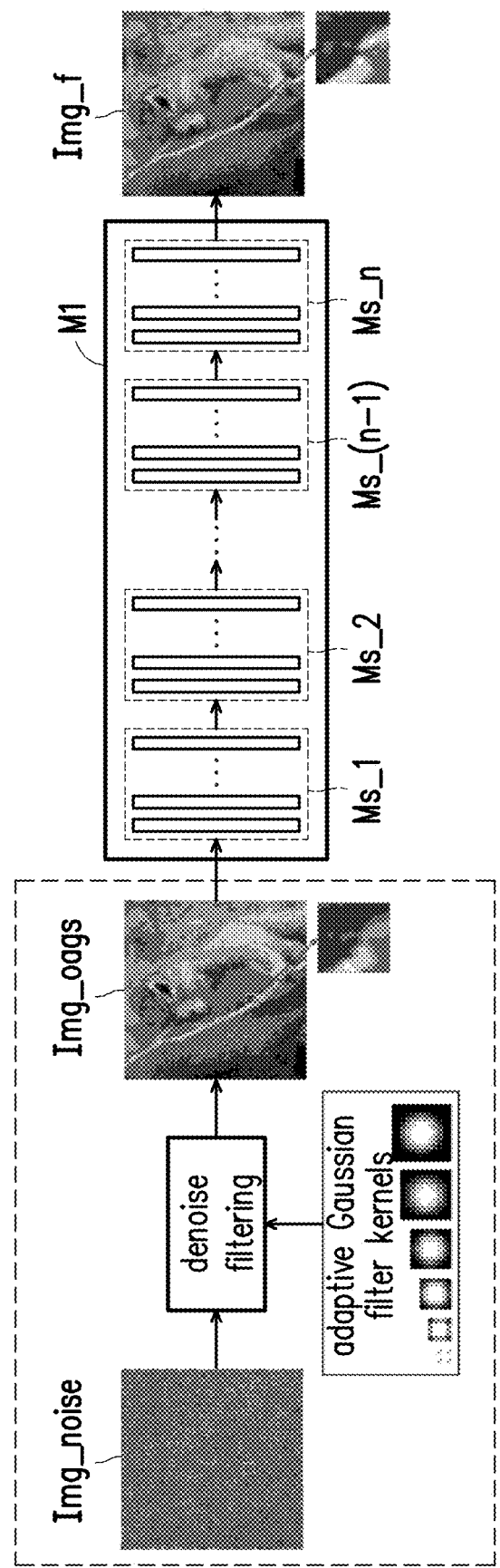
FIG. 3 is a schematic diagram of an image quality improvement method according to an embodiment of the disclosure.

FIG. 2 is a flowchart of an image quality improvement method according to an embodiment of the disclosure. FIG. 3 is a schematic diagram of an image quality improvement method according to an embodiment of the disclosure. With reference to FIG. 1, FIG. 2, and FIG. 3, the method of this embodiment is adapted for the image processing apparatus 10 in the above embodiment. Detailed steps of the image quality improvement method in this embodiment are described as follows with reference to elements in the image processing apparatus 10.

In step S201, the processor 120 receives an original image Img_noise. In this embodiment, the original image Img_noise may be an image including noise. In other embodiments, the original image may be an image in need of image inpainting, meaning that the image may have missing data regions.

In step S202, the processor 120 performs denoising filtering to the original image Img_noise by a filter to obtain a preliminary processing image Img_oags. Here, the processor 120 may use a filter mask sliding in the original image Img_noise to identify noise pixels in the filter mask, and may remove the noise pixels according to other non-noise pixels in the filter mask. In other words, the processor 120 preliminarily eliminates the noise in the original image Img_noise and removes the noise pixels by the filter, thereby generating the preliminary processing image Img_oags.

In this embodiment, the filter includes an overlapped adaptive Gaussian smoothing filter. Through a Gaussian filter mask that may be overlapped and its adaptively adjusted size, the processor 120 may use the non-noise pixels to remove the noise pixels. In detail, the processor 120 may first generate a non-noise pixel map of the original image Img_noise. In the non-noise pixel map of the original image Img_noise, the noise pixel may be represented as "0" and the non-noise pixel may be represented as "1." In an embodiment, if the amount of non-noise pixels is too small in the preset mask, the processor 120 enlarges the size of the Gaussian filter mask. The processor 120 may sequentially use the Gaussian filter masks of different mask sizes to generate multiple restoration results for each noise pixel in the original image Img_noise, and average the restoration results of these noise pixels to remove the noise pixels in the original image Img_noise and generate the preliminary processing image Img_oags.

However, in other embodiments, the filter may be implemented as a linear filter, a non-linear filter, or an adaptive filter, such as a mean filter, a median filter, a weighted median filter, a bilateral filter, or the like.

In step S203, the processor 120 inputs the preliminary processing image Img_oags to a multi-stage convolutional network model M1 to generate an optimization image Img_f through the multi-stage convolutional network model M1. In this embodiment, the multi-stage convolutional network model M1 includes multiple convolutional network sub-models Ms_1 to Ms_n, and these convolutional network sub-models Ms_1 to Ms_n respectively correspond to different network architectures. Specifically, the processor 120 repairs and restores image details in the preliminary processing image Img_oags through the multi-stage convolutional network model M1. These convolutional network sub-models Ms_1 to Ms_n are sequentially connected to each other in series and respectively have multiple convolutional layers. Based on this, except the first-stage convolutional network sub-model Ms_1 where an input image is the preliminary processing image Img_oags, input images in the second-stage convolutional network sub-model Ms_2 to the nth-stage convolutional network sub-model Ms_n are all network generated images output by their previous-stage convolutional network sub-models Ms_1 to Ms_(n−1). For example, the input image of the convolutional network sub-model Ms_2 is the network generated image output by the convolutional network sub-model Ms_1. Through image optimization sequentially performed by these convolutional network sub-models Ms_1 to Ms_n, the last-stage convolutional network sub-model Ms_n may finally generate the optimization image Img_f.

Considering the differences in features and advantages of the convolutional network sub-models Ms_1 to Ms_n of different network architectures, the disclosure connects the convolutional network sub-models Ms_1 to Ms_n of multiple different network architectures in series. In this way, the optimization image Img_f generated by the processor 120 has good denoising effect, retains more image details, and reproduces image naturalness.

It should be noted that based on the serial connection of the convolutional network sub-models Ms_1 to Ms_n, the convolutional network sub-models Ms_1 to Ms_n in the multi-stage convolutional network model M1 are established through synchronous training. Moreover, in an embodiment, during training of the multi-stage convolutional network model M1, the convolutional network sub-models Ms_1 to Ms_n are generated through synchronous training based on multiple loss functions. These loss functions may be used to supervise the convolutional network sub-models Ms_1 to Ms_n in different stages, so as to accurately establish the multi-stage convolutional network model M1 meeting the requirements.

In an embodiment, the processor 120 adds a loss layer into the multi-stage convolutional network model M1 during training. The loss layer compares the network generated images of each convolutional network sub-model Ms_1 to Ms_n with a real image to calculate multiple loss values according to the corresponding loss functions. The processor 120 may determine whether the multi-stage convolutional network model M1 completes learning according to these loss values. In addition, the processor 120 may adjust weight data in the multi-stage convolutional network model M1 one by one from back to front by backpropagation according to these loss values. In an embodiment, the loss layer is only used during training and may be removed when the training is completed.

Figure 4:
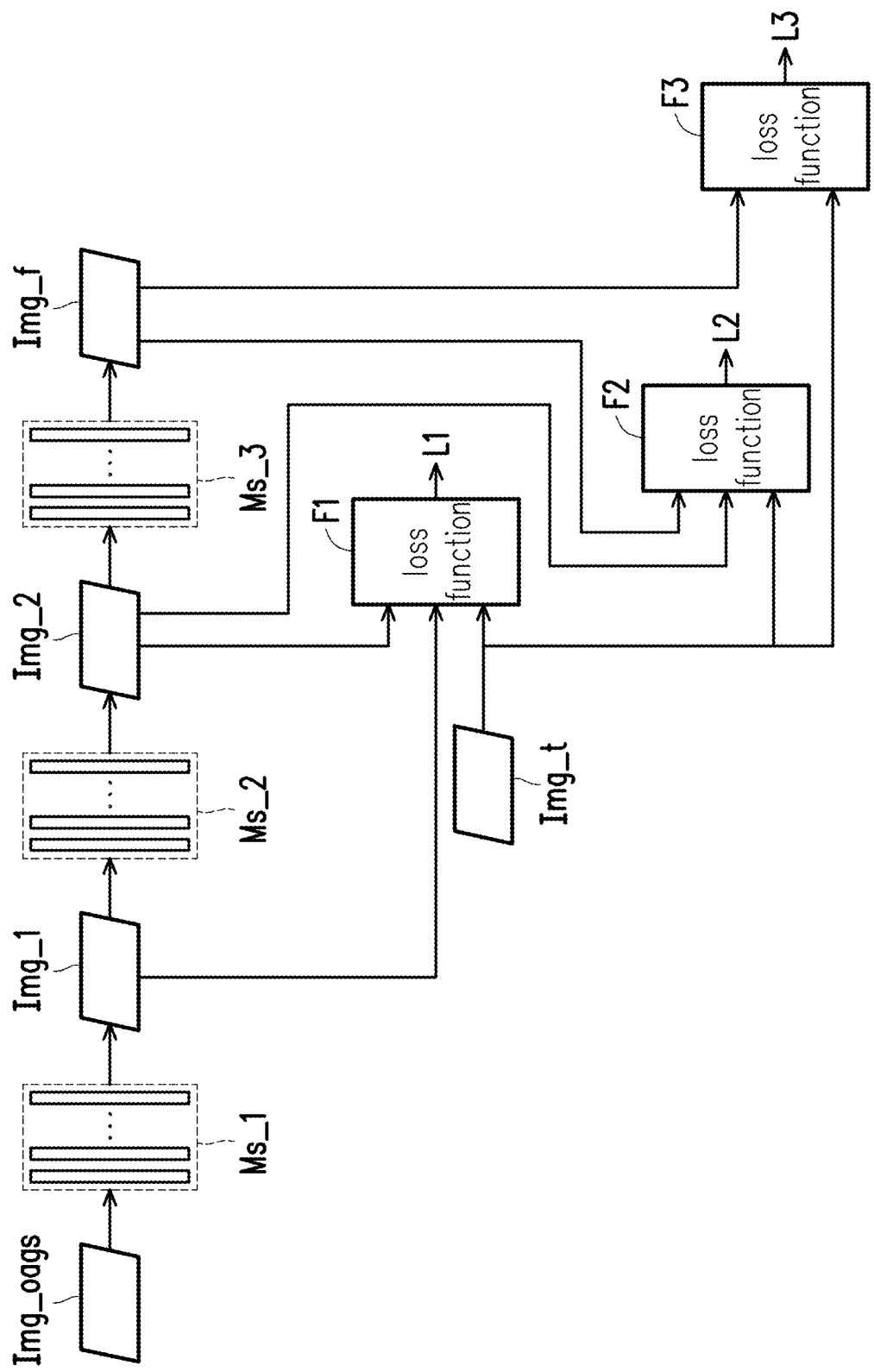
FIG. 4 is a schematic diagram of a multi-stage convolutional network model according to an embodiment of the disclosure.

FIG. 4 is a schematic diagram of a multi-stage convolutional network model according to an embodiment of the disclosure. With reference to FIG. 4, taking three-stage convolutional network sub-models Ms_1 to Ms_3 (n=3) for example, the convolutional network sub-models Ms_1 to Ms_3 may include the first-stage convolutional network sub-model Ms_1, the second-stage convolutional network sub-model Ms_2, and the third-stage convolutional network sub-model Ms_3. The processor 120 inputs the preliminary processing image Img_oags to the first-level convolutional network sub-model Ms_1 to generate a first network generated image Img_1 by the first-level convolutional network sub-model Ms_1. The first network generated image Img_1 is input to the second-stage convolutional network sub-model Ms_2. That is, the processor 120 inputs the first network generated image Img_1 to the second-stage convolutional network sub-model Ms_2 to generate a second network generated image Img_2 by the second-stage convolutional network sub-model Ms_2. Next, the processor 120 inputs the second network generated image Img_2 to the third-stage convolutional network sub-model Ms_3 to generate the optimization image Img_f by the third-stage convolutional network sub-model Ms_3.

In an embodiment, the first-stage convolutional network sub-model Ms_1 may be a preprocessing convolutional network model, which includes multiple convolutional layers. These convolutional layers in the convolutional network sub-model Ms_1 respectively uses multiple convolutional kernels to perform convolution operations. The second-stage convolutional network sub-model Ms_2 may be a residual U-net model. The residual U-net model has an encoder layer and a decoder layer of the same size having a connection therebetween. The residual U-net model adopts a residual learning strategy at its end and may better restore the image details and sharpen the image to avoid excessive fitting. The third-stage convolutional network sub-model Ms_3 may be a conditional generative adversarial network (cGAN) model. In an embodiment, during training of the cGAN model, the cGAN model has a generator and a discriminator. Through interactive training of the generator and the discriminator, the discriminator may guide the generator to generate results closer to the real image so that images generated by the generator may retain more image details and reproduce image naturalness. In other words, in an embodiment, the optimization image finally output is generated by the generator of the cGAN model.

In this embodiment, based on the serial connection of the convolutional network sub-models Ms_1 to Ms_3, the convolutional network sub-models Ms_1 to Ms_3 in the multi-stage convolutional network model M1 are established through synchronous training on the basis of a multi-stage loss function, and the multi-stage loss function includes a weighted sum of multiple loss functions. In this embodiment, the loss functions used to be combined to form the multi-stage loss function may include a first loss function F1, a second loss function F2, and a third loss function F3. The first loss function F1 performs calculation according to a real image Img_t, the first network generated image Img_1, and the second network generated image Img_2. In addition, the second loss function F2 performs calculation according to the real image Img_t, the second network generated image Img_2, and the optimization image Img_f. The third loss function F3 performs calculation according to the real image Img_t and the optimization image Img_f. Therefore, a function output of the multi-stage loss function may be obtained by weighting and summing function outputs L1 to L3 of the first loss function F1, the second loss function F2, and the third loss function F3. In an embodiment, the first loss function F1 may be a pixel mean square error (MSE) function, which is a mean square error between each pixel of the network generated images and each pixel of the real image. The second loss function F2 may be a conditional generative network loss function. The third loss function F3 may be a perceptual loss function, such as a content loss function.

Figure 5:
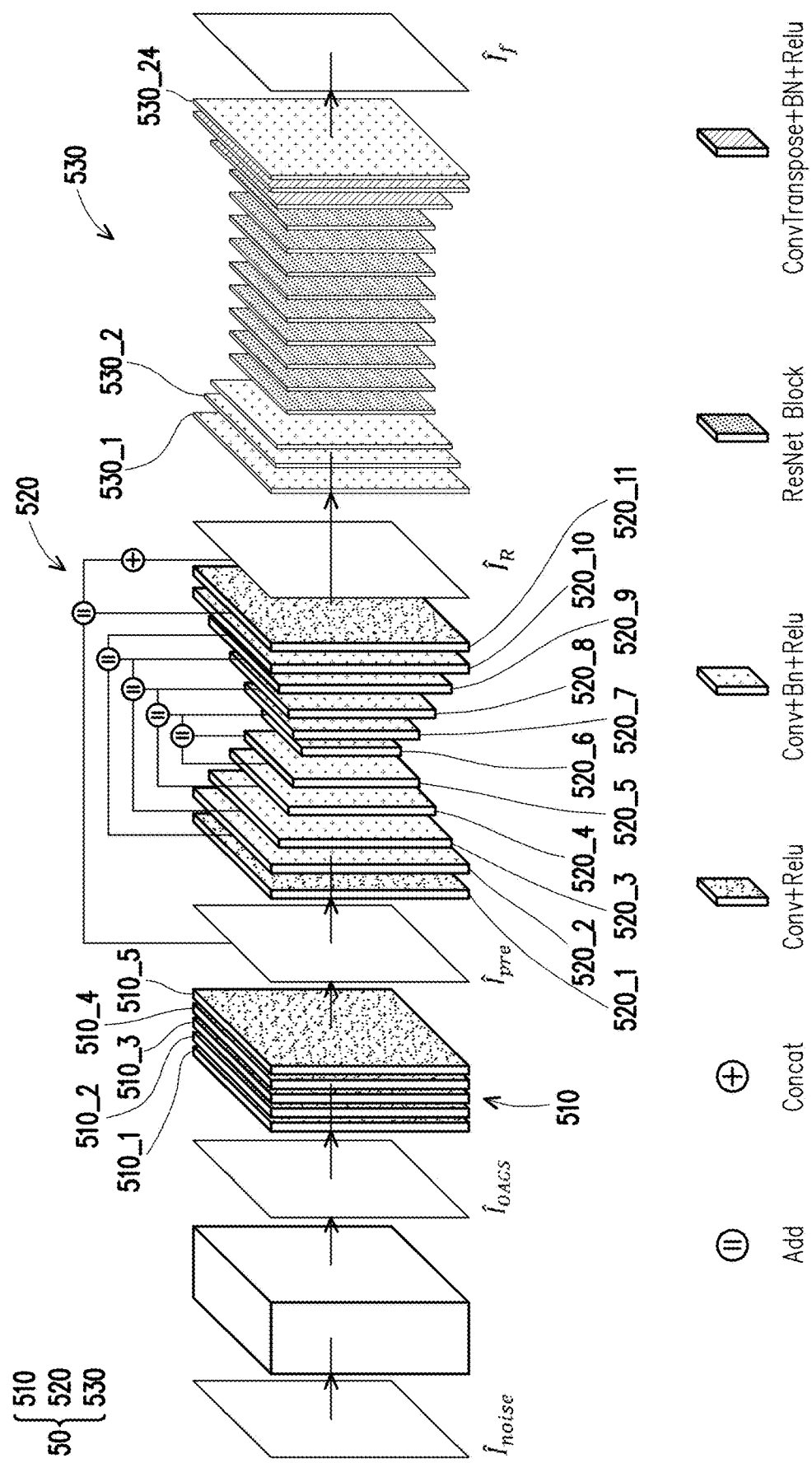
FIG. 5 is a schematic diagram of an image quality improvement method according to an embodiment of the disclosure.

FIG. 5 is a schematic diagram of an image quality improvement method according to an embodiment of the disclosure. With reference to FIG. 5, in this embodiment, a multi-stage convolutional network model 50 includes a preprocessing convolutional network model 510, a residual U-net model 520, and a cGAN model 530. The preprocessing convolutional network model 510, the residual U-net model 520, and the cGAN model 530 are sequentially connected to each other in series. In this embodiment, a preliminary processing image $\hat{I}_{OAGS}$ may be generated by using the overlapped adaptive Gaussian smoothing filter to denoise an original image $\hat{I}_{noise}$.

The preprocessing convolutional network model 510 may include five convolutional layers 510_1 to 510_5, but the disclosure is not limited thereto. The convolutional layers 510_1 to 510_5 may use multiple n*n convolutional kernels, such as 3*3 convolutional kernels, to perform convolution operations. In this embodiment, the convolutional layers 510_1 to 510_5 may use, for example, a rectified linear unit (ReLU) function as an excitation function. In addition, except the convolutional layer 510_1 in the first layer where an input channel is 3 and the convolutional layer 510_5 in the fifth layer where an output channel is 3, output channels and input channels in other layers may be, for example, 64. In addition, the convolutional layers 510_1 to 510_5 may have sliding strides equal to 1 and padding parameters equal to 1. The output of the convolutional layer 510_1 is fed to the convolutional layer 510_2, the output of the convolutional layer 510_2 is fed to the convolutional layer 510_3, and so on. After the convolution operations of the five convolutional layers 510_1 to 510_5, the preprocessing convolutional network model 510 may output a first network generated image $\hat{I}_{pre}$.

Next, the residual U-net model 520 may include encoder layers 520_1 to 520_5, a bridge layer 520_6, and decoder layers 520_7 to 520_11. When the sliding strides and the padding parameters are set to be 1, the encoder layers 520_1 to 520_5, the bridge layer 520_6, and the decoder layers 520_7 to 520_11 may respectively use multiple n*n convolutional kernels, such as 3*3 convolutional kernels, to perform convolution operations. The encoder layers 520_1 to 520_5, the bridge layer 520_6, and the decoder layers 520_7 to 520_10 may, for example, use the ReLU function as an excitation function. The encoder layers 520_2 to 520_5 may perform non-overlapping pooling operations to avoid excessive fitting of the model. The decoder layers 520_7 to 520_10 may perform upsampling operations through, for example, bilinear interpolation. In addition, the encoder layers 520_2 to 520_5, the bridge layer 520_6, and the decoder layers 520_7 to 520_11 may have batch normalization (BN). It should be noted that based on the residual learning strategy and in order to retain lost information during the pooling operations of the encoder layers 520_2 to 520_5, the first network generated image $\hat{I}_{pre}$ and the output of the encoder layers 520_2 to 520_5 are overlaid or linked with the outputs of the subsequent layers. After convolution operations and other related operations of the encoder layers 520_1 to 520_5, the bridge layer 520_6, and the decoder layers 520_7 to 520_11, the residual U-net model 520 may output a second network generated image $\hat{I}_R$.

Next, the cGAN model 530 receives the second network generated image $\hat{I}_R$ and finally generates an optimization image $\hat{I}_f$. It should be noted that FIG. 5 only illustrates the generator in the cGAN model 530. In this embodiment, the generator of the cGAN model 530 may include 24 convolutional layers 530_1 to 530_24, and the convolutional layers 530_1 to 530_24 use multiple convolutional kernels to perform convolution operations, respectively. In addition, part of the convolutional layers in the cGAN model 530 may use a residual learning strategy to form 9 ResNet blocks and combine the outputs of the previous layers with the outputs of the subsequent layers. In this embodiment, one ResNet block may include two convolutional layers. In addition, the convolutional layers 530_1 to 530_24 may have batch normalization. For related details of using the cGAN model 530, reference may be made to related technical literature, such as "P. Isola, J. Zhu, T. Zhou, A. A. Efros, *Image-to-Image translation with conditional adversarial networks, in: Proc. Conf. Computer Vision and Pattern Recognition,* 2017 (2017)," and details are not described herein again. Through the processing of the cGAN model 530, the optimization image $\hat{I}_f$ may be more realistic and natural.

It should be noted that in this embodiment, the preprocessing convolutional network model 510, the residual U-net model 520, and the cGAN model 530 in the multi-stage convolutional network model 50 are established by training based on a multi-stage loss function. In an embodiment, the multi-stage loss function includes a weighted sum of multiple loss functions. In an embodiment, a total loss value may be generated by inputting the real image and the images respectively output by the preprocessing convolutional network model 510, the residual U-net model 520, and the cGAN model 530 to the multi-stage loss function. In following, weight information in the multi-stage convolutional network model 50 may be adjusted by backpropagation based on the total loss value generated by minimizing the multi-stage loss function.

In detail, since the preprocessing convolutional network model 510, the residual U-net model 520, and the cGAN model 530 may all output a complete image, the images output by the preprocessing convolutional network model 510, the residual U-net model 520, and the cGAN model 530 may be compared with the real image to generate the corresponding loss values, and thus the weight information in the preprocessing convolutional network model 510, the residual U-net model 520, and the cGAN model 530 is iterated and adjusted according to these loss values. The aforementioned weight information is kernel element values in the convolutional kernels.

In this embodiment, during training of the model, after the first network generated image $\hat{I}_{pre}$ and the second network generated image $\hat{I}_R$ are generated, a loss value $\mathcal{L}_{mse}$ may be calculated by using the first loss function F1 in Equation (1) below.

$$\mathcal{L}_{mse} = \mathbb{E}_{x,y}[\|F_{cpn}(\hat{I}_{OAGS}|x;\theta_1) - y\|^2 + \|F_{rru}(\hat{I}_{pre}|x;\theta_2) - y\|^2], \quad \text{Equation (1)}$$

In the above, $F_{cpn}(\hat{I}_{OAGS}|x; \theta_1)$ represents an output pixel generated by the preprocessing convolutional network model 510 according to the preliminary processing image $\hat{I}_{OAGS}$ under a condition that the weight information is $\theta_1$ (i.e., a pixel of the first network generated image $\hat{I}_{pre}$). $F_{rru}(\hat{I}_{pre}|x; \theta_2)$ represents an output pixel generated by the residual U-net model 520 according to the first network generated image $\hat{I}_{pre}$ under a condition that the weight information is $\theta_2$ (i.e., a pixel of the second network generated image $\hat{I}_R$), and y represents a pixel of the real image. $\mathbb{E}_{x,y}$ represents an expected value (an average value) of all x, y pairs (i.e., the model output pixels and the pixels thereof corresponding to the real image).

In addition, the second loss function F2 is a conditional generative network loss function of the cGAN model 530, and the conditional generative network loss function includes a consistency loss $\mathcal{L}_{L1}$ and an adversarial loss $\mathcal{L}_{GAN}$ as shown in Equation (2). After generating the optimization image $\hat{I}_f$, the loss value may be calculated by using the second loss function of Equation (2) below.

$$\mathcal{L}_{cGAN} = \mathcal{L}_{GAN} + \lambda_1 \mathcal{L}_{L1} \quad \text{Equation (2)}$$

In the above, $\lambda 1$ is a weight value, which may be configured according to actual conditions. The consistency loss $\mathcal{L}_{L1}$ may be generated according to Equation (3) below, and the adversarial loss $\mathcal{L}_{GAN}$ may be generated by calculating according to Equation (4) below. Equation (3) is a mean absolute error (MAE) function, and Equation (4) is a cross-entropy loss function.

$$\mathcal{L}_{L1} = \mathbb{E}_{x,y}[\|y - F_{gan}(\hat{I}_R|x;\theta_3)\|_1] \quad \text{Equation (3)}$$

$$\mathcal{L}_{GAN} = \mathbb{E}_{x,y}[\log D(\hat{I}_R|x,y;\theta_4)] + \mathbb{E}_x[\log(1 - D(\hat{I}_R|x, F_{gan}(\hat{I}_R|x;\theta_3);\theta_4))] \quad \text{Equation (4)}$$

In the above, y represents the pixel of the real image, and $F_{gan}(\hat{I}_R|x; \theta_3)$ represents an output pixel generated by the cGAN network model 530 according to the second network generated image $\hat{I}_R$ under a condition that the weight information of the generator is $\theta_3$ (i.e., the pixel of the optimization image $\hat{I}_f$). The weight information of the discriminator of the cGAN model 530 is $\theta_4$.

In addition, the third loss function F3 is a content loss function as shown in Equation (5). After generating the optimization image $\hat{I}_f$, the third loss function F3 of the following Equation (5) may be used to calculate a loss value $\mathcal{L}_{content}$.

$$\mathcal{L}_{content} = \mathbb{E}_{\phi,x,y}[(\phi(F_{gan}(\hat{I}_R|x;\theta_3)) - \phi(y))^2] \quad \text{Equation (5)}$$

In the above, y represents the pixel of the real image, and $F_{gan}(\hat{I}_R|x; \theta_3)$ represents an output pixel (i.e., the pixel of the optimization image $\hat{I}_f$) generated by the cGAN network model 530 according to the second network generated image $\hat{I}_R$ under a condition that the weight information of the generator is $\theta_3$. $\phi(\cdot)$ represents a feature map generated by the convolutional layer of the cGAN model 530 as the real image and the second network generated image $\hat{I}_R$ are respectively input to the cGAN network model 530. The content loss function is used to calculate feature difference of the feature maps output by the convolutional layer.

Finally, the multi-stage loss function of this embodiment may be as shown in Equation (6).

$$\mathcal{L} = \mathcal{L}_{content} + \lambda_2 \mathcal{L}_{mse} + \lambda_3 \mathcal{L}_{cGAN} \qquad \text{Equation (6)}$$

In the above, $\lambda 2$ and $\lambda 3$ are weight values, which may be configured according to actual conditions. Based on this, the multi-stage convolutional network model 50 in the embodiment of the disclosure is trained through the multi-stage loss function shown in Equation (6) so that the trained multi-stage convolutional network model 50 may generate the optimization image retaining image details according to images including noise components or images in missing data regions. Specifically, the first loss function F1 may ensure that the pixel of the last generated optimization image is as close as possible to real information, the second loss function F2 may ensure that the last generated optimization image is highly natural, and the third loss function F3 may ensure that the perceived content of the last generated optimization image is as similar as possible to the real information.

In summary, in the embodiments of the disclosure, denoising filtering is preliminarily performed to the original image by the filter, and the multi-stage convolutional network model including multiple convolutional network sub-models is used to repair the image edge and restore image details. In this way, for an original image with high-density noise, the disclosure may eliminate image noise and generate an optimization image retaining image details. In addition, the multi-stage loss function is used for synchronous training of each convolutional network sub-model in the multi-stage convolutional network model. The multi-stage convolutional network model in the embodiments of the disclosure has good denoising and image repair capabilities. On the other hand, compared to directly inputting noise images without any filtering processing to the convolutional network model for denoising, the multi-stage convolutional network model in the embodiments of the disclosure has a relatively low training cost and good denoising effect with no limit to noise density, providing a clear and realistic restored image.

Although the disclosure has been described with reference to the above embodiments, they are not intended to limit the disclosure. It will be apparent to one of ordinary skill in the art that modifications to the described embodiments may be made without departing from the spirit and the scope of the disclosure. Accordingly, the scope of the disclosure will be defined by the attached claims and their equivalents and not by the above detailed descriptions.

What is claimed is:

1. An image quality improvement method, comprising:
receiving an original image;
performing denoising filtering to the original image by a filter to obtain a preliminary processing image; and
inputting the preliminary processing image to a multi-stage convolutional network model to generate an optimization image through the multi-stage convolutional network model, wherein the multi-stage convolutional network model comprises a plurality of convolutional network sub-models, and the convolutional network sub-models respectively correspond to different network architectures,
wherein the convolutional network sub-models comprise a first-stage convolutional network sub-model, a second-stage convolutional network sub-model and a third-stage convolutional network sub-model, the preliminary processing image is input to the multi-stage convolutional network model, and a step of generating the optimization image through the multi-stage convolutional network model comprises:
inputting the preliminary processing image to the first-stage convolutional network sub-model to generate a first network generated image by the first-stage convolutional network sub-model;
inputting the first network generated image to the second-stage convolutional network sub-model to generate a second network generated image by the second-stage convolutional network sub-model; and
inputting the second network generated image to the third-stage convolutional network sub-model to generate the optimization image by the third-stage convolutional network sub-model,
wherein the convolutional network sub-models are generated through synchronous training based on a multi-level loss function, and the multi-level loss function comprises a weighted sum of a plurality of loss functions.

2. The image quality improvement method according to claim 1, wherein the filter comprises an overlapped adaptive Gaussian smoothing filter.

3. The image quality improvement method according to claim 1, wherein the first-stage convolutional network sub-model is a preprocessing convolutional network model, the second-stage convolutional network sub-model is a residual U-net model, and the third-stage convolutional network sub-model is a conditional generative adversarial network model.

4. The image quality improvement method according to claim 1, wherein the loss functions comprise a first loss function, a second loss function, and a third loss function, the first loss function performs calculation according to a real image, the first network generated image, and the second network generated image, and the second loss function and the third loss function perform calculation according to a real image and the optimization image.

5. An image processing apparatus, comprising:
a storage circuit;
a processor, coupled to the storage circuit and configured to:
receive an original image;
perform denoising filtering to the original image by a filter to obtain a preliminary processing image; and
input the preliminary processing image to a multi-stage convolutional network model to generate an optimization image through the multi-stage convolutional network model, wherein the multi-stage convolutional network model comprises a plurality of convolutional network sub-models, and the convolutional network sub-models respectively correspond to different network architectures,
wherein the convolutional network sub-models comprise a first-stage convolutional network sub-model, a second-stage convolutional network sub-model and a third-stage convolutional network sub-model, and the processor is configured to:
input the preliminary processing image to the first-stage convolutional network sub-model to generate a first network generated image by the first-stage convolutional network sub-model;
input the first network generated image to the second-stage convolutional network sub-model to generate a second network generated image by the second-stage convolutional network sub-model; and input the second network generated image to the third-stage convolutional network sub-model to generate the optimization image by the third-stage convolutional network sub-model, wherein the convolutional network sub-models are generated through synchronous training based on a multi-level loss function, and the multi-level loss function comprises a weighted sum of a plurality of loss functions.

6. The image processing apparatus according to claim 5, wherein the filter comprises an overlapped adaptive Gaussian smoothing filter.

7. The image processing apparatus according to claim 5, wherein the first-stage convolutional network sub-model is a preprocessing convolutional network model, the second-stage convolutional network sub-model is a residual U-net model, and the third-stage convolutional network sub-model is a conditional generative adversarial network model.

8. The image processing apparatus according to claim 5, wherein the loss functions comprise a first loss function, a second loss function, and a third loss function, the first loss function performs calculation according to a real image, the first network generated image, and the second network generated image, and the second loss function and the third loss function perform calculation according to a real image and the optimization image.

* * * * *